United States Patent
Salvagio

(10) Patent No.: US 8,401,877 B2
(45) Date of Patent: *Mar. 19, 2013

(54) INSURANCE CLAIM PROCESSING

(75) Inventor: Jana T. Salvagio, San Clemente, CA (US)

(73) Assignee: QBE Holdings, Inc., New York, NY (US)

( * ) Notice: Subject to any disclaimer, the term of this patent is extended or adjusted under 35 U.S.C. 154(b) by 250 days.

This patent is subject to a terminal disclaimer.

(21) Appl. No.: 12/579,971

(22) Filed: Oct. 15, 2009

(65) Prior Publication Data

US 2011/0035238 A1   Feb. 10, 2011

Related U.S. Application Data

(63) Continuation-in-part of application No. 12/535,787, filed on Aug. 5, 2009.

(51) Int. Cl.
G06Q 40/00   (2012.01)
(52) U.S. Cl. ............ 705/4; 705/301; 705/313; 705/314
(58) Field of Classification Search .............. 705/4, 301, 705/313, 314
See application file for complete search history.

(56) References Cited

U.S. PATENT DOCUMENTS

| | | |
|---|---|---|
| 7,124,112 B1 | 10/2006 | Guyan et al. |
| 2003/0120588 A1* | 6/2003 | Dodd et al. ............. 705/38 |
| 2005/0071203 A1 | 3/2005 | Maus |
| 2005/0262016 A1* | 11/2005 | Hill et al. ............. 705/39 |
| 2007/0011021 A1 | 1/2007 | Worstell et al. |
| 2007/0179818 A1 | 8/2007 | Magnus |
| 2007/0226018 A1* | 9/2007 | Gross et al. ............. 705/4 |
| 2009/0201172 A1 | 8/2009 | Edell |
| 2009/0234670 A1 | 9/2009 | Larsen |
| 2009/0265193 A1 | 10/2009 | Collins et al. |

* cited by examiner

Primary Examiner — Muriel Tinkler
(74) Attorney, Agent, or Firm — Jennifer L. Gregor; Godfrey & Kahn, S.C.

(57) ABSTRACT

A method, computer-readable medium, and apparatus by which a user may access information about one or more properties may be used by an insurance provider or claims administrator to provide an information portal to its clients. User input identifying one or more foreclosed properties may be received. Then, property data may be retrieved from a property database, and the property data may include property damage information and insurance claim information for each of the identified properties. Then, based on the retrieved property data, it may be determined whether an identified property is damaged and whether an insurance claim was filed. Subsequently, information corresponding to the identified property may be displayed, and this information may include a damage indicator and an insurance claim status indicator.

12 Claims, 19 Drawing Sheets

FIG. 7

| PAYMENT | COVERAGE | ADMIN | CLAIMS | RESEARCH | PROPERTY | FILES | ACTIVITIES | MAILBOX | CHECKS |

FILE DETAILS

[QUERY]

GENERAL INFO:
    FILE NUMBER: XXXXXXX
    CLAIM STATUS: CLAIM FILED

PROPERTY INFORMATION:
    ACCESS INFO: LOCK BOX XXX
    ADDRESS: XXX BBB AVENUE, UNIT X

LOSS INFORMATION:
    SUBFILE NUMBER: X
    LOSS CAUSE: GREASE FIRE
    LOSS DESCRIPTION: STOVE DAMAGE

SUBFILE NUMBER: X
    LOSS CAUSE: VANDALISM
    LOSS DESCRIPTION: APPLIANCES REMOVED

CLAIMS SUMMARY

CLAIM NUMBER: XXXXXXXX
SUBFILE: X
CLAIM TYPE: LPP
LENDER CLAIM STATUS: NEW CLAIM
INSURANCE VERIFICATION COMPLETE? Y

CLAIM NUMBER: XXXXXXXX
SUBFILE: X
CLAIM TYPE: OC
LENDER CLAIM STATUS: NEW CLAIM
INSURANCE VERIFICATION COMPLETE? Y

CLAIM DETAILS:
CLAIM NUMBER: XXXXXXXX  DATE OF LOSS: 1/1/2009  ADJUSTER CONTACT NO: XXX-XXX-XXXX
COVERAGE: LPP  ADJUSTER NAME: FIRST LAST  POLICY NUMBER: XXXXXXX 700, 705, 710, 715, 720, 725

FIG. 9

| PAYMENT | COVERAGE | ADMIN | CLAIMS | RESEARCH | PROPERTY | FILES | ACTIVITIES | MAILBOX | CHECKS |

900

FILE DETAILS

SHOW: DOCUMENT SUMMARY

GENERAL INFO:
   DOCUMENT NUMBER: XXXXXX
   FILE NUMBER: XXXXXXX
   CLAIM STATUS: CLAIM FILED

DOCUMENT REQUESTS

| TYPE: | TEMPLATE NAME: | STATUS | SIGNATURE: | CREATED BY: | DATE: |
|---|---|---|---|---|---|
| ALL | STATUS LETTER | SUBMITTED | FIRST M. LAST | LAST, FIRST | 1/26/2009 |
| ALL | PAYMENT LETTER | IN PROCESS | FIRST M. LAST | LAST, FIRST | 1/26/2009 |
| ALL | FILING LETTER | SUBMITTED | FIRST M. LAST | LAST, FIRST | 1/27/2009 |

RECIPIENT

| PRIMARY RECIPIENT?: | NAME: | STATUS | DISTRIBUTION METHOD: | | |
|---|---|---|---|---|---|
| YES | FIRST1 LAST1 | IN PROCESS | MAIL | | |
| NO | FIRST2 LAST2 | SENT | FAX | | |
| NO | FIRST3 LAST3 | SENT | INTERNAL FORWARDING | | |

| | START PAGE | END PAGE | | FILE NUMBER | |
|---|---|---|---|---|---|
| | 1 | 15 | | XXXXXXX | |

ATTACHMENTS:

| NAME | TYPE |
|---|---|
| INSPECTION | IMAGE |

FIG. 10

| PAYMENT | COVERAGE | ADMIN | CLAIMS | RESEARCH | PROPERTY | FILES | ACTIVITIES | MAILBOX | CHECKS |

Show: MY MAILBOX

| FILE NUMBER | DOC REC'D DATE | DOC ID: | DOC TYPE: | STATUS: |
|---|---|---|---|---|
| XXXXX | 1/29/09 | DOCXXXX | PROPERTY IMAGES | OPEN |
| XXXXX | 2/01/09 | DOCXXXX | CLAIM AS FILED | OPEN |
| XXXXX | 2/04/09 | DOCXXXX | RECEIPT | CLOSED |

| PAYMENT | COVERAGE | ADMIN | CLAIMS | RESEARCH | PROPERTY | FILES | ACTIVITIES | MAILBOX | CHECKS |

Show: INSURANCE CHECKS

| NEW | EDIT | QUERY | | VOID |

| FILE NUMBER | CLAIM NUMBER | LOSS DATE | AMOUNT | STATUS |
|---|---|---|---|---|
| 000001 | C0000001 | 1/29/09 | $17,074.03 | PENDING |
| 000002 | C0000002 | 2/01/09 | $9,215.03 | SHRED |
| 000003 | C0000003 | 2/04/09 | $101,934.01 | MAILED |

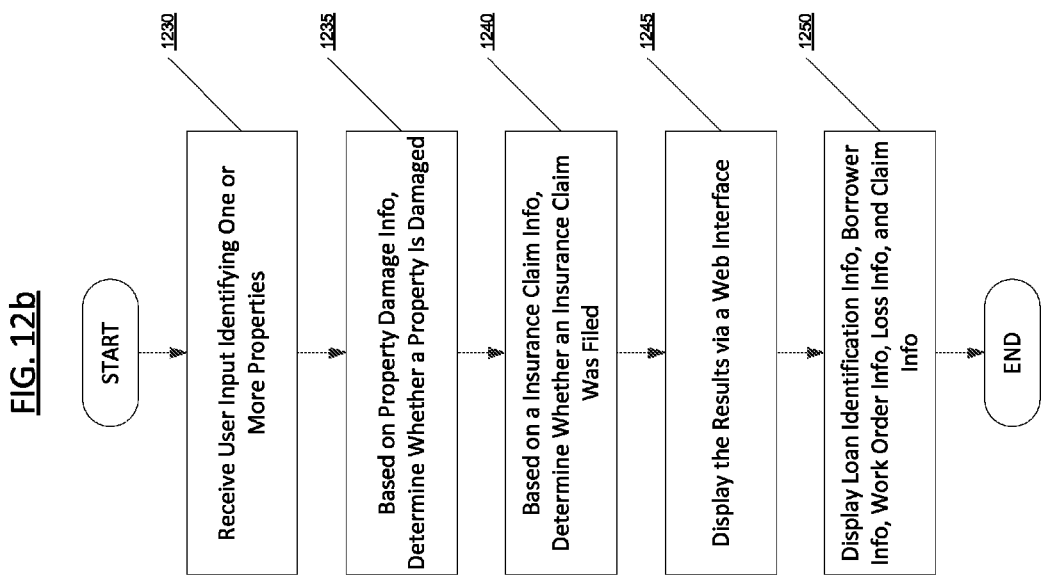

FIG. 15

Sub-File Details 1800

Property Info 1805

| Field | Value | ID |
|---|---|---|
| Loan # | XXXXXXXX | 1805a |
| Address | AAA XXX ST. | 1805b |
| City | CITY | 1805c |
| State | STATE | 1805d |
| ZIP Code | XXXXX | 1805e |
| Borrower First Name | FIRST NAME | 1805f |
| Borrower Last Name | LAST NAME | 1805g |

Report Info 1610

| Field | Value | ID |
|---|---|---|
| Work Order # | XXXX | 1610a |
| Inspection Date | 5/6/2008 | 1610b |
| Upload Date | 5/6/2008 | 1610c |
| Damage Indicator | Yes | 1610d |
| Review Date | 5/10/2008 | 1610e |
| Status | Closed with Payment | 1610f |

Coverage Info 1615

| Field | Value | ID |
|---|---|---|
| Coverage | LPP | 1615a |
| Carrier Name | COMPANY1 | 1615b |
| Policy # | XXXXXXXX | 1615c |
| Effective Start | 12/25/2007 | 1615d |
| Effective End | 12/25/2008 | 1615e |
| Deductible Amount | $5,000.00 | 1615f |
| Coverage Status | Active | 1615g |
| Insurance Verification Completion Date | 5/11/2008 | 1615h |

1620  HOME 1620a  PRINT 1620b

Loss Info 1625

| Field | Value | ID |
|---|---|---|
| Loss Type | Vandalism | 1625a |
| Loss Cause | Vandalism | 1625b |
| Date of Loss | 5/6/2008 | 1625c |
| Tech Review Status | Closed | 1625d |

Claim Information 1630

| Field | Value | ID |
|---|---|---|
| Claim # | XXXXXXXX | 1630a |
| Claim Filed Date | 5/25/2008 | 1630b |
| Claim Status | Closed with Payment | 1630c |
| Close Date | 6/29/2008 | 1630d |
| Denial Reason | | 1630e |
| Dispute Flag | Yes | 1630f |

1640  Record 1 of 2 >>

| Field | Value | ID |
|---|---|---|
| File Owner | Filer XXX | 1680a |
| Claim Age (calendar) | 35 | 1680b |
| Total Payment Amount | $7,256.00 | 1680c |

1635  View LPP Claim

FIG. 16

Work Order Detail — 1700

- Loan # — 1705a — xxxxxxx
- Property Address — 1705b — AAA XXX ST.
- Property City — 1705c — CITY
- Property State — 1705d — STATE
- Property ZIP Code — 1705e — xxxxx
- Borrower First Name — 1705f — FIRST NAME
- Borrower Last Name — 1705g — LAST NAME

- Work Order # — 1705h — XXXX
- Order Category — 1705i — 5 of 8
- Inspection Date — 1705j — 5/6/2008
- Occupancy — 1705k — Vacant
- Damage Indicator — 1705l — Yes
- Upload Date — 1705m — 5/6/2008
- Review Date — 1705n — 5/10/2008
- Status — 1705o — Closed with Payment

1705

1710 — HOME (1710a), PRINT (1710b)

1715 — Picture #1 (1715a), Picture #2 (1715b), Picture #3 (1715c)

1720 — Sub-File #
- 1720a — XXXX
- 1720b — XXXX
- 1720c — XXXX

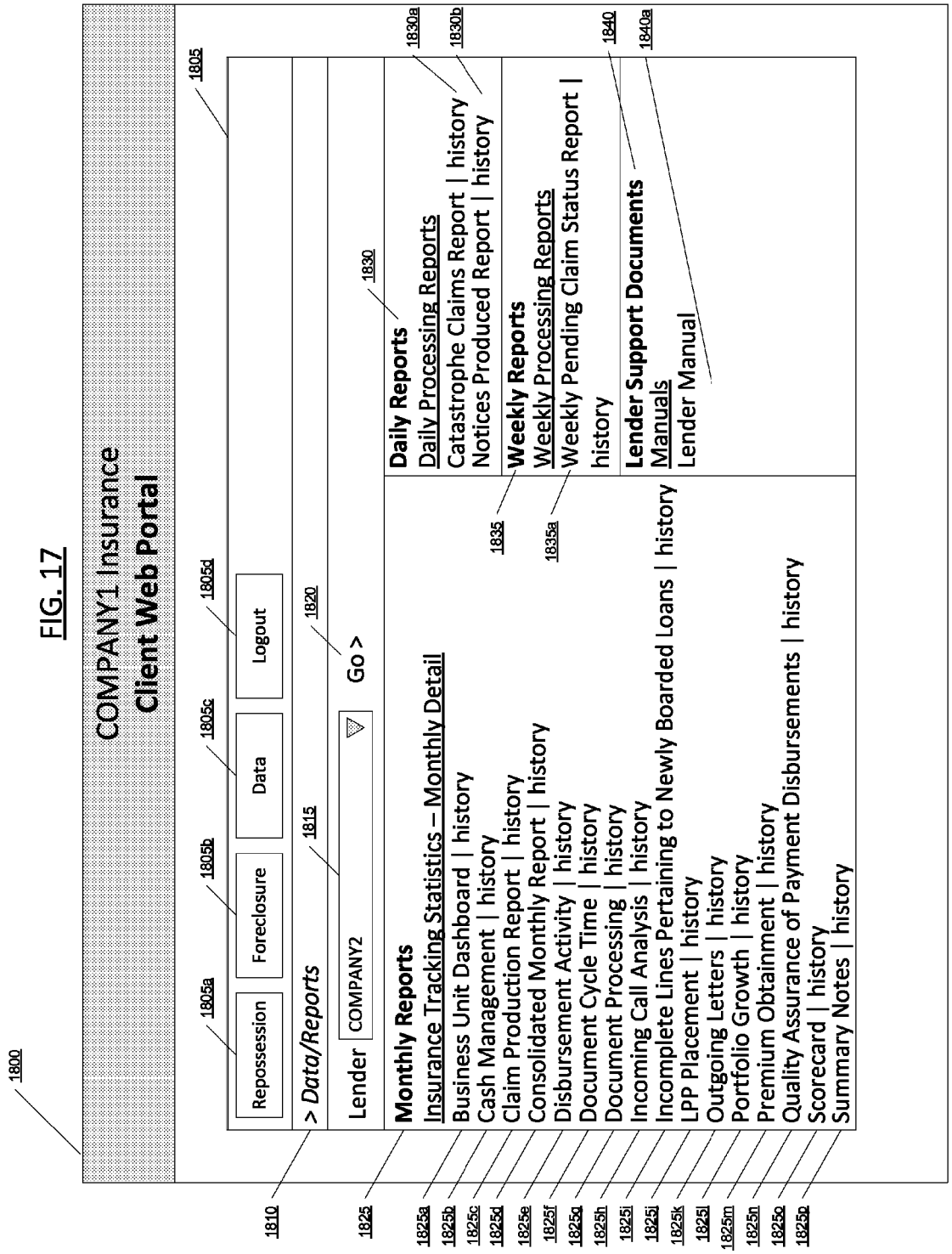

FIG. 18

Summary Report

Creation Date: 12/31/2008
Client: COMPANY2

| Count | | Report Period | | | | |
|---|---|---|---|---|---|---|
| Insurance_Type | Claim Summary Status | 200901 | 200902 | 200903 | 200904 | 200905 |
| LPP | CLOSED WITH PAYMENT | xxx | xxx | xxx | xxx | xxx |
|  | CLOSED, NO PAYMENT | xxx | xxx | xxx | xxx | xxx |
|  | PENDING | xxx | xxx | xxx | xxx | xxx |
| CPI Total | | xxx | xxx | xxx | xxx | xxx |
| OI | CLOSED WITH PAYMENT | xxx | xxx | xxx | xxx | xxx |
|  | CLOSED, NO PAYMENT | xxx | xxx | xxx | xxx | xxx |
|  | DMG BELOW THRESHOLD | xxx | xxx | xxx | xxx | xxx |
|  | PENDING | xxx | xxx | xxx | xxx | xxx |
| OI Total | | xxx | xxx | xxx | xxx | xxx |
| WAIVED WORK ORDER | CLOSED, NO PAYMENT | xxx | xxx | xxx | xxx | xxx |
| Waived Work Order Total | | xxx | xxx | xxx | xxx | xxx |
| RESEARCH | CLOSED, NO PAYMENT | xxx | xxx | xxx | xxx | xxx |
|  | DMG BELOW THRESHOLD | xxx | xxx | xxx | xxx | xxx |
|  | PENDING | xxx | xxx | xxx | xxx | xxx |
| Research Total | | xxx | xxx | xxx | xxx | xxx |
| Grand Total | | xxx | xxx | xxx | xxx | xxx |

INSURANCE CLAIM PROCESSING

CROSS-REFERENCE TO RELATED APPLICATIONS

This application is a continuation-in-part of application Ser. No. 12/535,787, entitled "Insurance Claim Processing" and filed Aug. 5, 2009, which is hereby incorporated by reference in its entirety.

BACKGROUND

Many purchasers making a large purchase, such as a house, car and the like, generally finance the purchase by borrowing money from a lender for a portion of the sale price. These lenders may be banks, mortgage companies, etc. The lender typically charges interest on the loan and may require collateral to protect the lender in situations where the borrowers cannot or choose not to pay back the loan. The collateral is usually, but not necessarily, the property involved in the transaction. In situations where the borrower defaults on the loan, the lender may exercise its contractual right to seize the collateral property and auction or otherwise sell the property in an attempt to recoup as much of the remaining loan amount as possible.

However, merely having title on a collateral property does not necessarily adequately protect the lender. For example, borrowers may wreck the property before the lender is able to reclaim possession, thus causing the value of the property to plummet. In another example, the property may suffer damage from natural occurrences such as floods, earthquakes, and the like prior to the lender taking title to the property. Accordingly, a lender may require the borrower to procure insurance on the property to protect the lender should anything happen to the property that may jeopardize the lender's ability to recoup the remaining loan amount.

Currently, for situations where an insurance claim is appropriate, the lender may have to wait a substantial amount of time before receiving the proceeds of the claim because of various inefficiencies. Moreover, the lender may be required to be an active participant throughout the entire insurance claim process. For example, with respect to a home foreclosure, the lender may be required to actively engage in every aspect involved in filing an insurance claim. The lender might first contact a field service company requesting a property review, and after receiving the results from a field service company, might upload the field results onto a website. Next, the lender may have to contact a third party administrator to determine whether the results of the property review justify the filing of an insurance claim, and if so, file such claim with the insurance carrier. Such a process may require that the lender spend valuable resources before obtaining the proceeds of the insurance claim. Indeed, the duration of such a process may be lengthened due to the fact that the lender is not in the business of filing insurance claims and thus does not necessarily possess the knowledge or the resources sufficient to file such claims.

Moreover, each party involved in the claims process maintains their own database or files corresponding to their portion of the claims process. Accordingly, when a party (e.g., a lender) requires information not found in their database, the party must spend resources contacting another party (e.g., an insurance carrier) to obtain the information, which leads to the wasting of more time and resources.

SUMMARY

This summary is provided to introduce a selection of concepts in a simplified form that are further described below in the Detailed Description. The Summary is not intended to identify key features or essential features of the claimed subject matter, nor is it intended to be used to limit the scope of the claimed subject matter.

While the following descriptions are based upon the situation where the property involved is a house, such as a condo, townhouse, detached house, etc., the methods, system and apparatus described herein may be applicable to any type of property, not limited to, but including automobiles, boats, motorcycles, ATVs, home appliances, consumer electronics, and the like.

Instead of requiring the lender to be actively involved from the time that the borrower defaults to when the lender receives the insurance claim proceeds, a method, system and apparatus may be utilized to streamline the claims process such that the claims process may be performed almost entirely without the lender's involvement. That is, once the lender contacts the field service company (e.g., a company contracted to investigate the property to determine damage to the property) and identifies the house, condo, or other real property as the "foreclosed" property to be inspected, the lender might not have to perform further actions in order to receive the insurance claims proceeds, when appropriate. Instead, a system may be utilized to reduce the amount of time for damage assessment and enable the lender to receive the claim proceeds in a shorter amount of time than currently possible. The integrated system may analyze the field inspection file to determine damage on the property, receive a determination of coverage, file insurance claims and track internal and external carrier insurance claims.

In one aspect, integrating the various systems (e.g., the damage indicator system, coverage determination system, claims filing system, claims processing system, and the like) may produce a stream-lined process saving the lender time and providing the lender proceeds from a claim, when appropriate, within a shorter turn-around time.

In one aspect, the system is maintained by an (internal) insurance carrier, where the system of the insurance carrier may determine that one claim is covered by the insurance carrier ("covered internally") and files a claim on behalf of the insured with the insurance carrier. In another aspect, the system may determine that another claim is covered by a different insurance carrier (e.g., an external or competing carrier) and the system may prompt an agent to file a claim on behalf of the insured with the external insurance carrier.

In one aspect, an integrated system may provide to a technical team agent property information such as the inspection file, insurance information, and the property indicated to be damaged, in order to assist the agent in determining whether the damage is sufficient to file an insurance claim.

In another aspect, an integrated system may provide to a coverage team agent a property file to allow the coverage team agent to conduct research on the insurance carrier and policy information. Further, the integrated system may receive and store the results of the research.

In another aspect, an integrated system may be accessible to a first insurance carrier (e.g., an internal insurance carrier) and might not be accessible to a second insurance carrier (e.g., an external insurance carrier). The system may provide to an internal insurance carrier claims agent information related to an external insurance carrier to assist the claims agent in contacting the external insurance carrier to file the claim with the external insurance carrier, when appropriate.

In another aspect, an integrated system may automatically create an insurance claim and file it with an insurance carrier.

In yet another aspect, methods and systems are provided by which users may access information about one or more properties and cause such information to be displayed. The methods and systems may be used by an insurance provider or claims administrator to provide an information portal to its clients (e.g., insurance carriers). The clients of these providers may be permitted to access the information portal and view information about one or more properties. This information portal may also provide information about insurance claims, and may include other information about the properties, such as information corresponding to damage to and repair of the properties.

BRIEF DESCRIPTION OF THE DRAWINGS

The foregoing Summary of the claimed subject matter, as well as the following Detailed Description of illustrative embodiments, is better understood when read in conjunction with the accompanying drawings, which are included by way of example, and not by way of limitation, with regard to the claimed subject matter.

FIG. 7 is an illustrative interface related to claims information in accordance with one or more aspects described herein.

FIG. 9 is an illustrative interface related to a document summary in accordance with one or more aspects described herein.

FIG. 10 is an illustrative interface related to a mailbox account in accordance with one or more aspects described herein.

FIG. 11 is an illustrative interface related to payment management in accordance with one or more aspects described herein.

FIG. 12b is a flowchart illustrating another method of providing information about one or more properties.

FIG. 15 illustrates another user interface allowing a user to access and view information about one or more properties according to one or more aspects described herein.

FIG. 16 illustrates another user interface allowing a user to access and view information about one or more properties according to one or more aspects described herein.

FIG. 17 illustrates another user interface allowing a user to access and view information about one or more properties according to one or more aspects described herein.

FIG. 18 illustrates a monthly processing report according to one or more aspects described herein.

DETAILED DESCRIPTION

This summary is provided to introduce a selection of concepts in a simplified form that are further described below in the Detailed Description. The Summary is not intended to identify key features or essential features of the claimed subject matter, nor is it intended to be used to limit the scope of the claimed subject matter.

Figure 1:
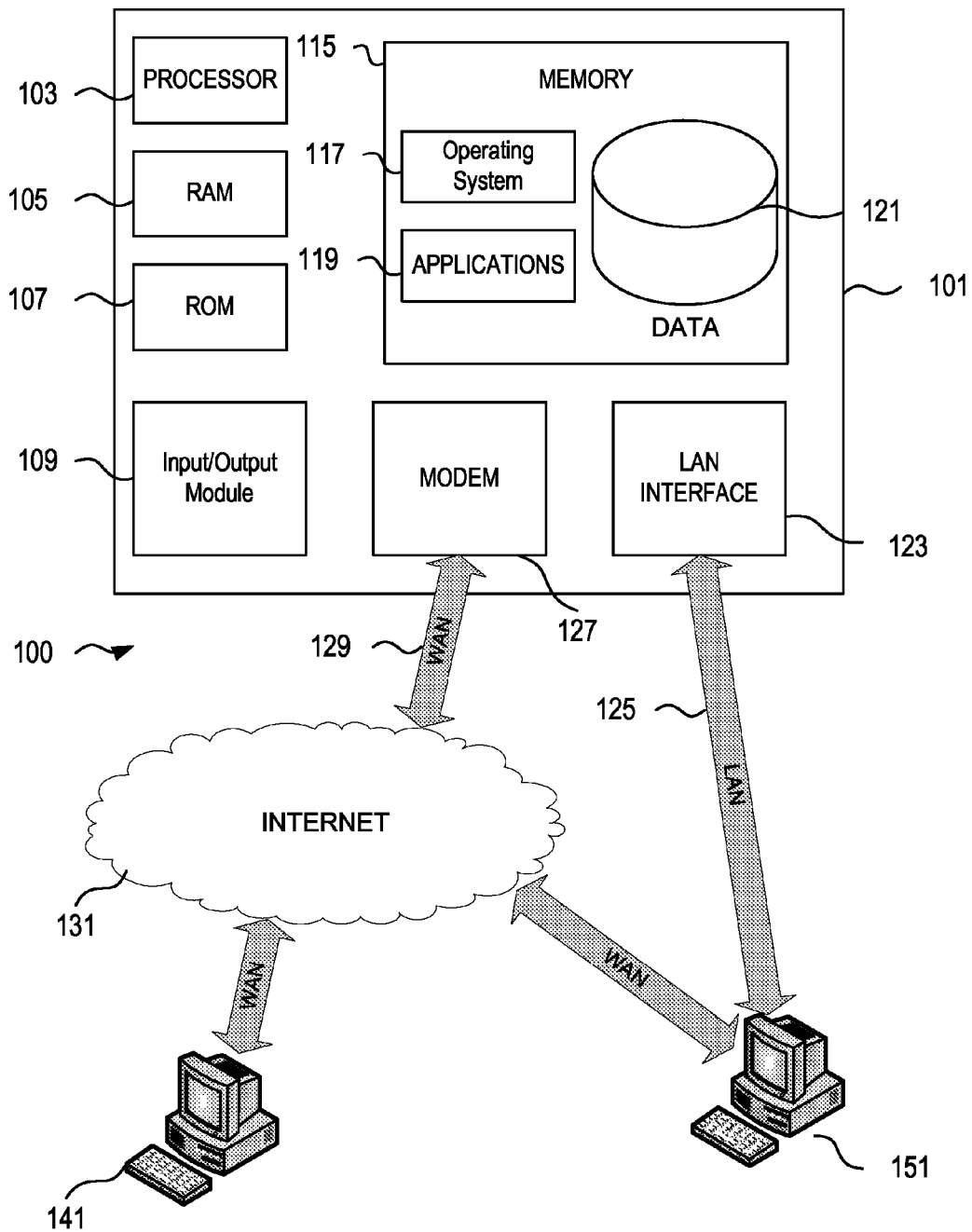
FIG. 1 illustrates a computer environment in which one or more aspects described herein may be implemented.

FIG. 1 illustrates a block diagram of a computing environment 100 including a generic computing device 101 (e.g., a computer server) that may be used according to an illustrative embodiment of the invention. The computer 101 may have a processor 103 for controlling overall operation of the server and its associated components, including RAM 105, ROM 107, input/output (I/O) module 109, and memory 115.

I/O 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown). As described in detail below, the database 121 may provide centralized storage of account information and account holder information for the entire business, allowing interoperability between different elements of the business residing at different physical locations.

The computer 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program 119 used by the computer 101 according to an illustrative embodiment of the invention may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. In one example, the computer-executable instructions may be stored on a physical storage device such as a memory (e.g., ROM or hardrive). The invention may also be practiced in distributed computing environments where tasks are performed by remote processing devices that are linked through a communications network. In a distributed computing environment, program modules may be located in both local and remote computer storage media including memory storage devices.

Figure 2:
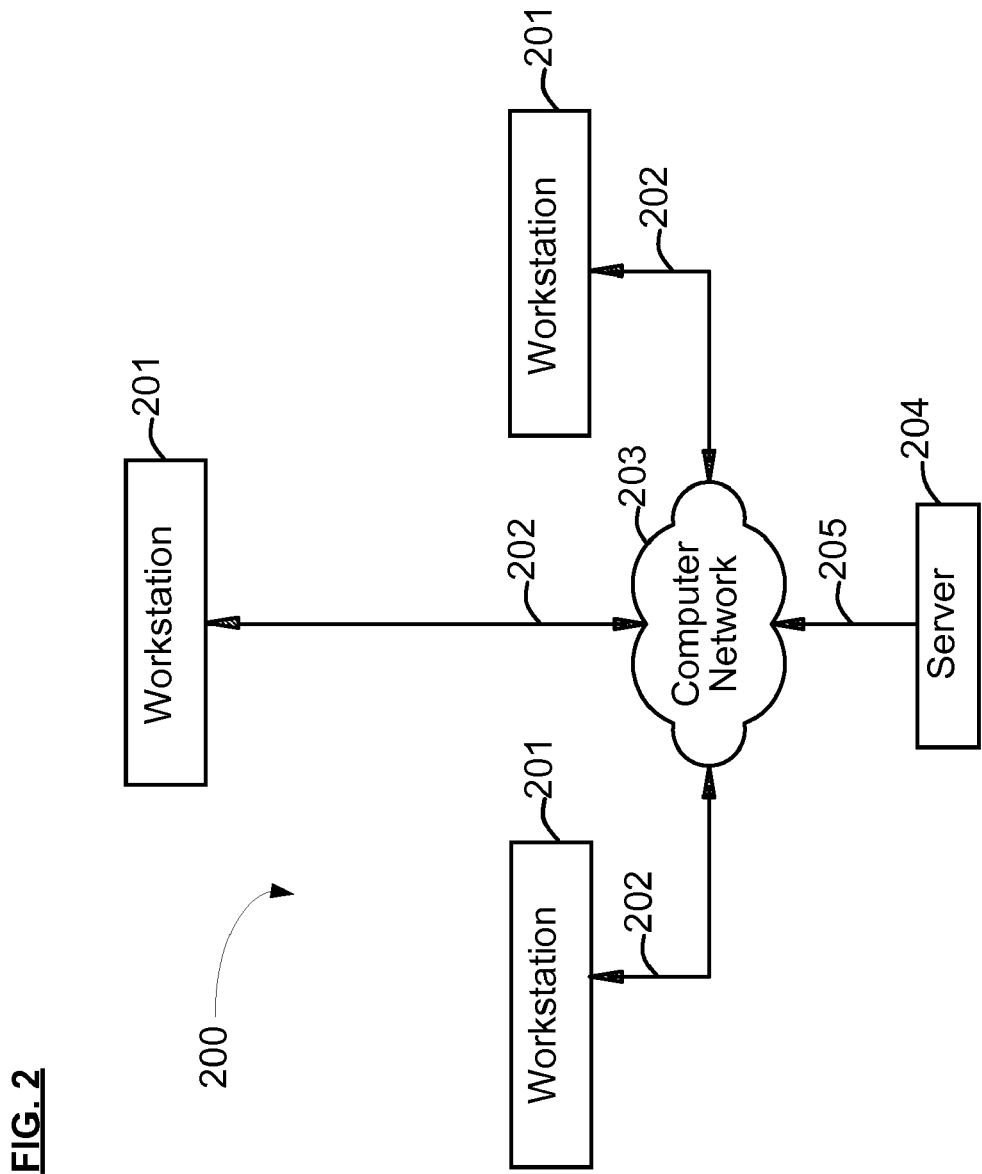
FIG. 2 illustrates a networking environment according to one or more aspects described herein.

Referring to FIG. 2, an illustrative system 200 for implementing methods according to the present invention is shown. As illustrated, system 200 may include one or more workstation (computers) 201. Computers 201 may be local or remote, and are connected by one or communications links 202 to computer network 203 that is linked via communications links 205 to a server 204. In system 200, server 204 may be any suitable server, processor, computer, or data processing device, or combination of the same. In one example, server 204 may be a computing device 101. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201, and servers 204, such as network links, dial-up links, wireless links, hard-wired links, etc.

Computer 201, which may be a computing device 101, may send a request to the server 204 for information such a property file corresponding to a particular foreclosed property. An agent at computer 201 may view the requested information and may interact with the system by providing information or requesting additional information. Server 204 may automatically send computer 201 information responsive to the request. Alternatively, the server 204 may queue the relevant information and may send the information to computer 201 prior to a request.

As understood by those skilled in the art, the steps that follow in the figures may be implemented by one or more of the components in FIGS. 1 and 2 and/or other components, including other computing devices.

The technology, such as the devices and networks described in FIGS. 1 and 2 may allow an entity, such as an insurance carrier to determine whether the insurance carrier is responsible for a claim, and further to file the claim with the insurance carrier itself or another competing insurance carrier on behalf of the beneficiary when a determination is made that the claim is valid and proper.

Figure 3:
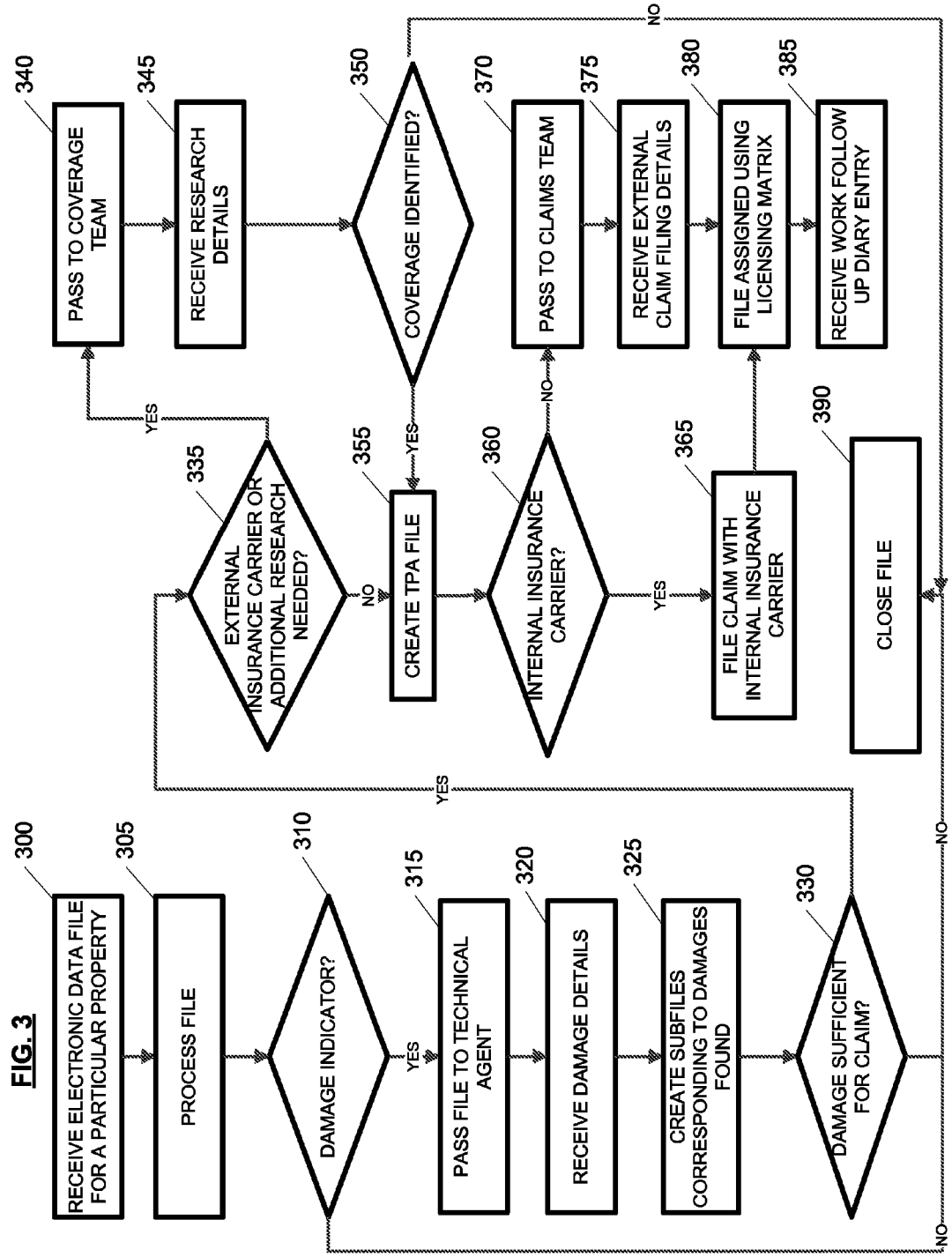
FIG. 3 is a flow chart illustrating a method of processing an insurance claim in accordance with one or more aspects described herein.

FIG. 3 illustrates a method of processing an insurance claim. At step 300, server 204 (as shown illustratively in FIG. 2) may receive property-specific information from a field service agency or company. The property-specific information, which may be part of an electronic data file, may include a description of the property, the current location of the property, notes entered by an inspector who has inspected the property, and the like. At step 305, server 204 may process the received file by adding insurance information which may cover the property. For instance, the server 204 may determine and add information such as the insurance carrier, insurance policy number, the effective date of insurance, the maximum amount of coverage under the policy, the person who procured the insurance, the expiration date of the policy, and the like.

The server 204, at step 310, may determine the status of a damage indicator related to the file received for the particular property. The damage indicator may be set by the inspector and may indicate whether the property inspected suffered damage. The damage indicator may be a part of the file and may be a selected text box or a particular field within the electronic file. Alternatively, the damage indicator may be a separate file or located apart from the electronic file received. If the damage indicator is negative or otherwise suggests that the property is not damaged, then the server 204 may update the file accordingly. Where no damage to the property is present or identified by the field service agent, an insurance claim might not be proper. However, if the damage indicator is determined at step 310 to be positive or otherwise suggests that the property is damaged, then server 204 may further process the file and prepare the file for further analysis by a technical agent, who may be utilizing workstation 201, at step 315.

In one aspect, a licensing matrix (e.g., a table which may be stored at server 204) may include each technical agent and a corresponding list of each state in which the agent is a licensed public adjuster. The licensing matrix may be utilized to ensure that a property is analyzed by an agent who possesses a license for the state in which the property is located. For example, an agent licensed in California and Nevada may be passed property files for properties located in either one of those two states and might not be passed files for properties located in any other state.

At step 320, the technical agent at workstation 201 receiving a file from server 204 with a positive determination of damage to the corresponding property may input data storable at server 204 indicating whether the damages are sufficient for a claim. For example, the technical agent may rule out duplicate damage, input a revised date of loss, enter full credit bid data, and the like. In one aspect, digital photos, videos, and/or other media may be included in the electronic file. These digital photos, videos, and/or other media may be viewed by the technical agent to assist the agent in determining whether the damage is sufficient for a claim.

Where applicable, the technical agent at workstation 210 may create subfiles. Each subfile may represent a divisible aspect of damage or loss. For example, damage to the roof may have resulted from a different peril (e.g., hail) than damage to the kitchen (e.g., grease fire), and may thereby require two subfiles. Alternatively, the subfiles may be created on the basis of insurance carriers. That is, the property may be insured by multiple carriers and one or more subfiles may be created based on the insurance company responsible for the aspect of the damage. The technical agent may create subfiles which each contain damage-related information such as a detailed description of the property damaged (e.g., rear section of roof) and the cause of the damage (e.g., hail) and submit them to the server 204 in step 325. Alternatively, the subfiles may be created and stored on server 204 directly.

Figure 5:
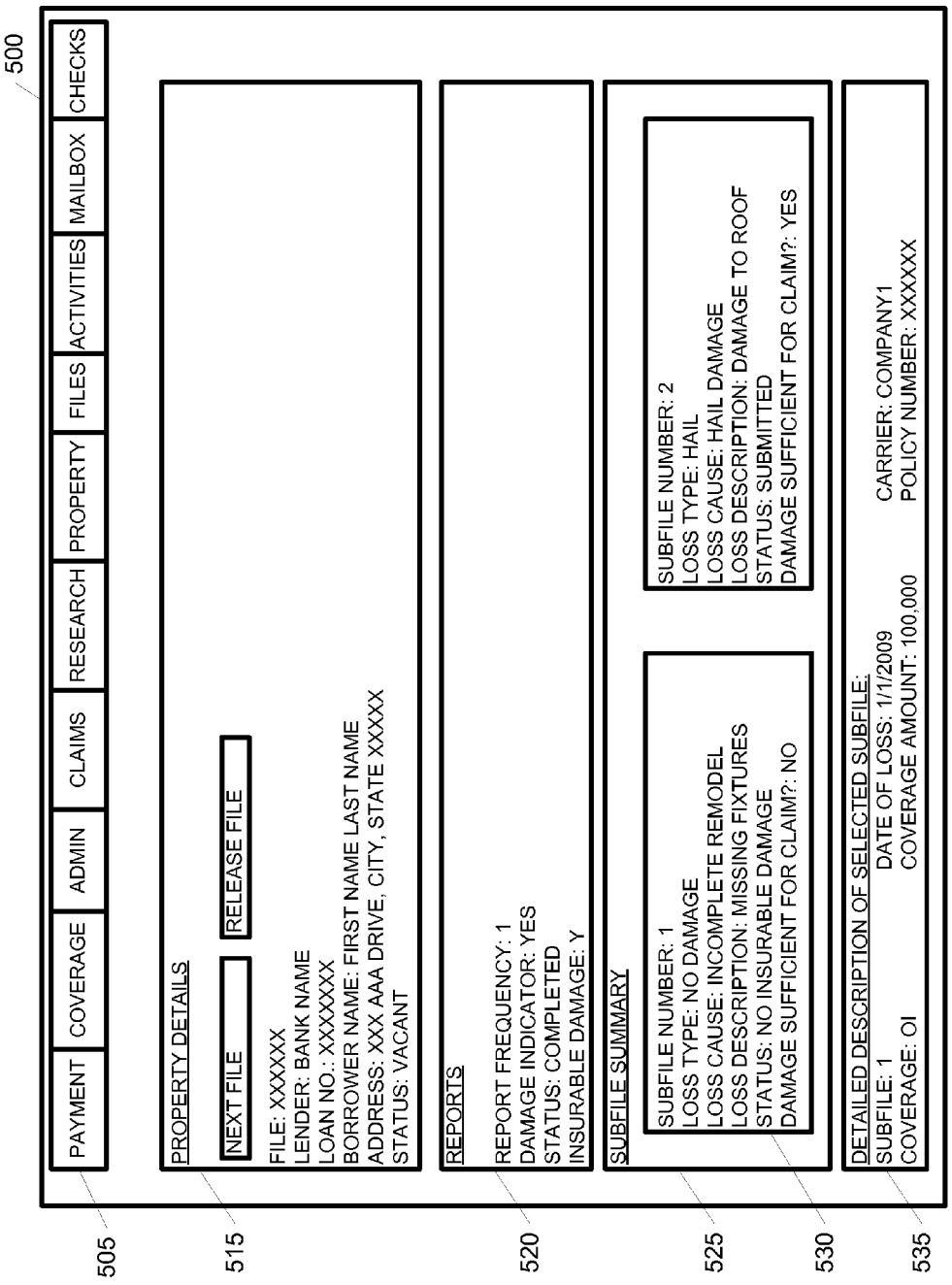
FIG. 5 is an illustrative interface related to damage determination in accordance with one or more aspects described herein.

Referring back to FIG. 3, a determination may be made at step 330 regarding whether each damage identified is sufficient to file a claim. Such a determination may be based on information inputted by the technical agent. If the determination suggests that the damage is not sufficient for a claim, the file may be updated and closed at step 390. In one aspect, the technical agent may update the file using an interface (e.g., as shown in FIG. 5).

If the determination suggests that the damage is sufficient for a claim, then at step 335, the server may determine whether the insurance carrier is an external insurance carrier or if more research is needed in order to make this determination. In one aspect, server 204 may be controlled by an insurance carrier. As such, the server may be internal to the carrier and vice versa. In another aspect, the server 204 may process claims covered by a competitor insurance carrier which might not have access to the server, and hence, may be an "external" insurance carrier.

Figure 6:
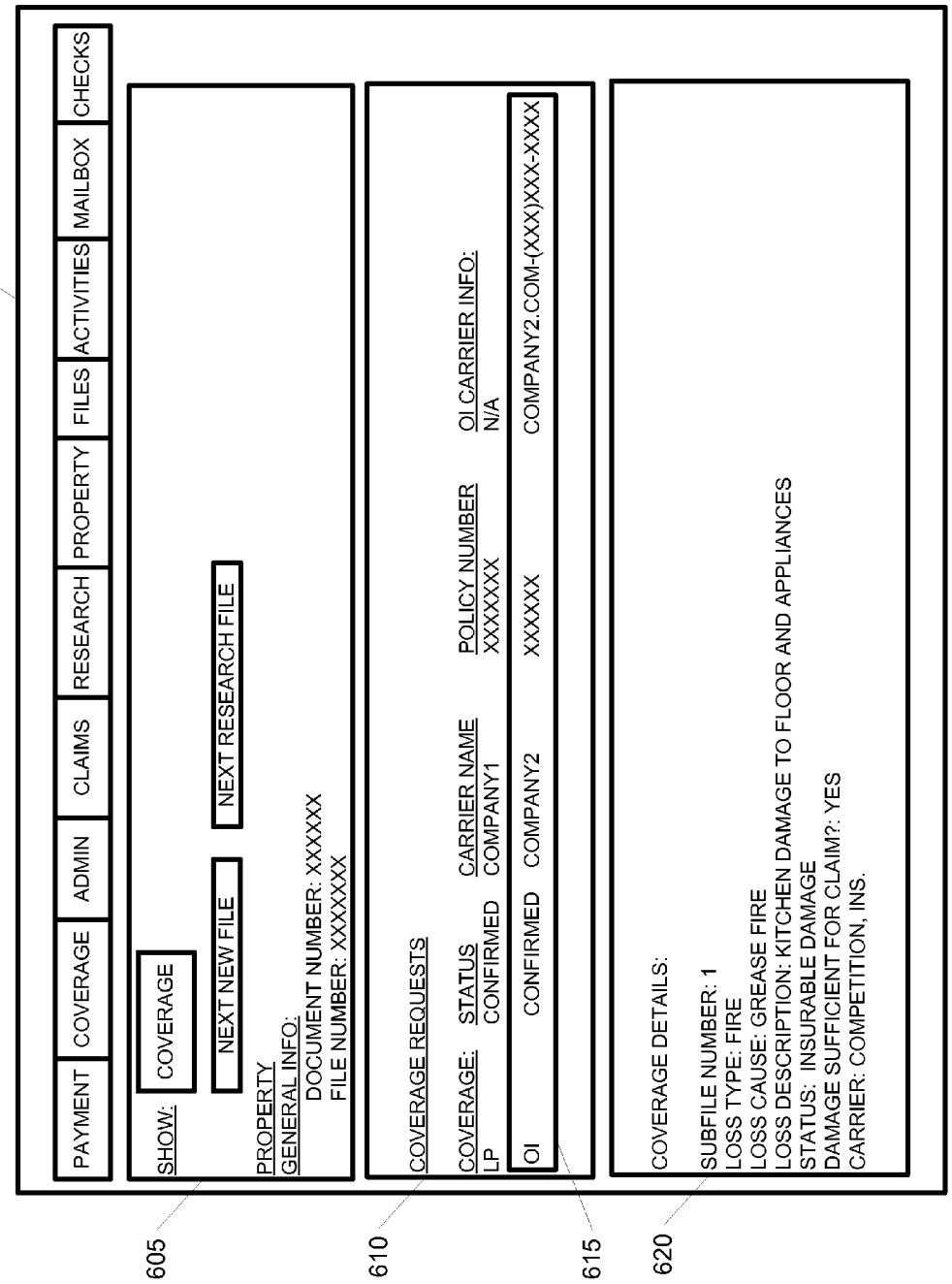
FIG. 6 is an illustrative interface related to coverage determination in accordance with one or more aspects described herein.

If the insurance carrier is an external insurance carrier, server 204 may process the file and alert the coverage team that further processing may be necessary at step 340. A coverage team agent, for example, utilizing workstation 201 may research details related to coverage information and may input the research results which may be stored at server 204 at step 345. The coverage team may further determine whether coverage is identified for the particular property and may enter the information at step 350. In one aspect, the coverage team agent may utilize a system interface (e.g., as shown in FIG. 6) to enter or update the information stored by server 204.

If coverage is identified, a claims summary file is created at step 355. A claims summary file may be created when external coverage is confirmed or when the coverage is provided by an internal carrier. For example, referring back to step 335 of FIG. 3, if server 204 determines that the insurance carrier is not an external insurance carrier or that no additional research is needed, the server may create a claims summary file or may convert the existing file and/or subfiles into a corresponding claims summary file at step 355.

If coverage is not determined to be applicable at step 350, the process may proceed to step 390 where the file is closed.

The server may determine, at step 360, whether the carrier is an internal insurance carrier based on the claims summary file. In response to determining that the carrier is an internal insurance carrier, the server may automatically file a claim on behalf of the insured at step 365. In one aspect, the insured is the lender.

However, if the carrier is not an internal insurance carrier, the server may pass the claims summary file and/or the property file and subfiles to a claims agent for further processing at step 370. Server 204 may receive and store claim filing details provided. For example, the claims agent may contact the external insurance carrier and receive a confirmation receipt or number. Such information may be stored by the server at step 375.

Regardless of whether the claim is filed with an internal or external carrier, the file corresponding to the property may be assigned using a licensing matrix at step 380. The licensing matrix, which may be the same table used in step 315, may be referenced to assign the file to a claims agent which possesses a valid public adjuster license for the state that the particular property is located.

The system, e.g., server 204, may provide claims agent reminders periodically to follow up on the claims whether internal or external and may store the results of the follow up process as an entry on a global work queue at step 385.

Figure 4:
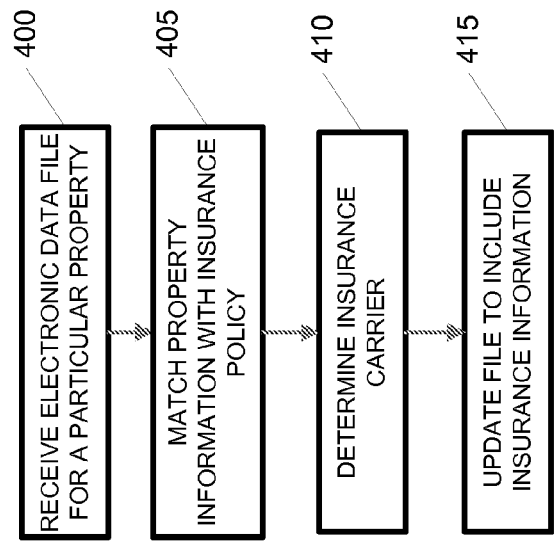
FIG. 4 is a flow chart illustrating a method of preparing an insurance file in accordance with one or more aspects described herein.

FIG. 4 illustrates a method of preparing an insurance file. At step 400, the server, e.g., server 204, may receive an electronic data file for a particular property. The server may determine the corresponding insurance policy at step 405. For example, the server may match information provided in the data file and the insurance policy such as a property address, property owner, and the like. At step 410, the server may determine an insurance carrier based on the insurance policy information. At step 415, the server may update the electronic data file to include the insurance information including the insurance carrier and the like.

In one aspect, the above methods may include agent interaction, or alternatively, the information processed by the above described methods may be supplemented, edited or further processed by one or more agents. For example, an agent may utilize an interface to access, edit, confirm, supplement, and/or update any information provided by or accessible by the server (e.g., server 204).

FIG. 5 illustrates an example of an interface 500 that may be presented to a technical agent on a display connected to workstation 201. In one aspect, interface 500 may display a tabular header illustrating the various aspects (e.g., files) that the system includes which are accessible by an agent for viewing, editing, transmitting, and the like. For example, the system may include a payment tab for causing the interface to display payment information when selected, a coverage tab for causing the interface to display coverage information when selected, a claims for causing the interface to display claims information when selected, and the like.

The interface, as shown in FIG. 5, may be displayed if the property tab is selected. At block 515, basic property information for a particular property may be displayed. The agent (e.g., a technical agent) may update the any of the information shown in FIG. 5 and may save the changes by selecting the "release file" button. The agent may browse the information or move onto the next file without saving the information by selecting the "next file" button. Block 520 may include report information including whether damage to the property is indicated by the damage indicator. Block 525 may include a subfile summary section, which may further include summaries of each subfile (e.g., block 530) corresponding to the property. Block 535 may be a detailed description of a default or selected subfile and may include information such as the insurance carrier, date of loss, whether the carrier is an internal or external carrier, coverage amount and the like.

FIG. 6 illustrates an interface 600 that may be presented to a coverage agent on a display on workstation 201. For example, interface 600 may display property information in box 605. Additionally, the interface may include a "next new file" and "next research file" interface keys to allow a coverage agent to determine which type of file the agent desires to view next. For example, the agent may select "next new file" in order to view the next available file that has not already been processed. Alternatively, the agent may select "next research file" in order to view the next available file that has been previously reviewed but may require additional research. FIG. 6 further includes coverage request box 610 which may list the coverage information corresponding to the property and may allow an agent to update any of the fields included. For example, the agent may update the request information to include that an outside insurer, "Competition, Ins.," has been confirmed to insure the grease fire damage on the property. Box 620 may include detailed information corresponding to any of the coverage requests (e.g., when a coverage request is selected as shown in box 615).

FIG. 7 illustrates a claims summary file. Interface 700 may display file information. In one aspect, the claims summary file may contain, where applicable, general information regarding the servicing of the file (e.g., file number, claim status, file creation date, claims team agent assigned to the file, and the like), property information (e.g., access info, location of property, and the like), loss information (e.g., subfile number, cause of loss, description of damaged property, date of loss, inspection date and the like) as shown in block 705. In addition, the claims summary file may include lender information (e.g., loan number, lender date, lender contact information), insurance information (e.g., carrier name, carrier contact information), policy information (e.g., policy number, policy effective date, coverage amount, damage threshold, deductible amount), claim information (e.g., date the claim was filed, status of claim, whether claim is disputed, estimate of claim). Where applicable, the claims summary file may also allow the input of information relating to any payments made on the claim or any other activities to be performed (e.g., scheduled follow-up). In addition, block 705 may include a query button selectable by an agent desiring to view claims summary block 715 and 725.

Claims summary block 715 may include subfile summaries (e.g., block 720) which may display claim number information, subfile information, claim status, claim type, lender status, and the like. Claim detail block 725 may provide further details to the claim such as adjuster name, contact information, and the like. The coverage agent may update any information included on the coverage interface screen 700 or may utilize the interface to obtain information.

Figure 8:
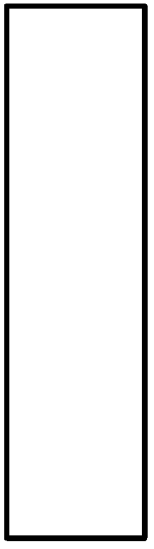
FIG. 8 is an illustrative interface related to activities management in accordance with one or more aspects described herein.

FIG. 8 illustrates a global work queue (activities) interface 800 and may contain fields corresponding to the various details of a claim, including the category of the claim, the type of claim step, the date by which the step of the claims process needs to be taken, the description, the priority, the status, and the like. Block 815 refers to a "take ownership" interface button which the agent may select to indicate that the agent is taking ownership or responsibility of a particular claim step.

The global work queue may also allow the agent to manually update the work queue including any fields included in the work queue. In another aspect, an agent may utilize the global work queue to sort the fields. For example, the agent may desire to sort the queue according to due dates corresponding to different claims. In another example, the agent may desire to sort the queue by claim type, next step to be taken, priority, the lender on whose behalf the claim may be filed, and the like.

FIG. 9 illustrates a document summary interface which the agent may access by selecting the "files" tab. FIG. 9 may display a summary of the document requests, recipient information and any attachments corresponding to the document request.

In one aspect, the system (e.g., server 204) may save the attachments (e.g., images, reports, and the like) corresponding to any file such that they are viewable by the agent and may be attachable to any document for delivery. In one aspect, the system may display a list of such images (e.g., contained in a file), as well as the person, department, or entity requesting such images and the method by which such images were distributed (not shown).

In another aspect, the system interface may include a mailbox for all in-bound documents as illustrated in FIG. 10. In one example, all in-bound documents may be imaged and stored, and may be accessed by an agent via the global work queue. An agent may further integrate such images into the property file or claims summary file. In another aspect, the global work queue may include a checks interface which allows the input of insurance checks as received, tracks checks in inventory, documents the end result and cycle time for each check, transmits check information to the corresponding claims summary file, and/or automatically generates activities to the claims team based on the status of the file. Additionally, the mailbox may include any out-bound documents (not shown).

FIG. 11 illustrates a checks or proceeds distribution summary interface 1100 which may be accessed by an agent upon selecting the "checks" tab. In one aspect, the agent may utilize the interface to view summary status of insurance checks for different claims. In another aspect, the agent may select a file number, e.g., file 00003, and may void the check mailed out if, for example, the check was mailed out in error. In response to receiving a command to void the check, the system may contact a bank system to alert the bank system that the check, if attempted to be cashed, is no longer valid. In addition, the system may send a form letter explaining to the recipient that the check was voided and listing the reason(s) for voiding the check.

Aspects described herein are contemplated to be applicable for use by any type of institution that is engaged in the insurance claim industry in order to reduce workload required from a lender. In one example, an insurance company may utilize the methods and systems described herein to evaluate and file insurance claims with itself and with other insurance companies on behalf of the insured (lender).

Figure 12A:
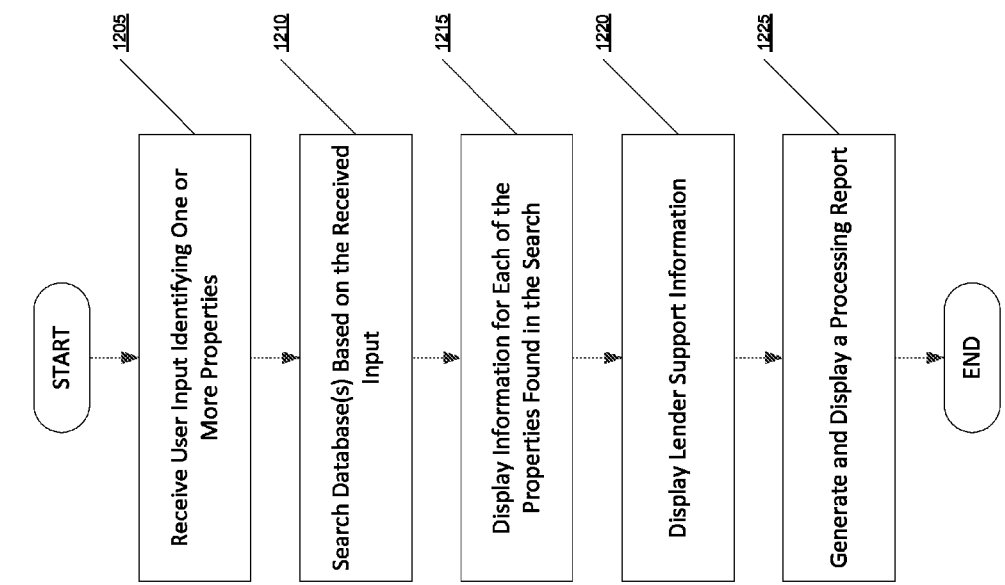
FIG. 12a is a flowchart illustrating a method of providing information about one or more properties.

In certain configurations, one or more of the systems of FIG. 2 (e.g., workstation 201, communication links 202 and 205, computer network 203, and/or server 204) may implement a method of providing information about one or more properties. FIG. 12a is a flowchart illustrating a method of providing information about one or more properties. In one or more arrangements, this method may be implemented to assist an entity in processing insurance claims. Specifically, this method may be used by an insurance provider or claims administrator to provide an information portal to its clients, wherein the clients are able to access the information portal to access and view information about one or more properties. The information may include information about one or more insurance claims, but it also may include other information about one or more properties.

In step 1205, user input identifying one or more properties may be received. The user input may include, for example, a street address, city, state, ZIP code, a loan number, a work order number, a claim number, a borrower first name, and/or a borrower last name. In step 1210, one or more databases may be searched based on the user input received in step 1205. In step 1215, information corresponding to each of the one or more properties found in the search may be displayed, enabling the user to access and view the results of the searching step 1210. The information displayed in step 1215 may include a record number, a loan number, an address, a borrower's name, a work order number, a report date, a sub-file number, a loss type indicator, a status indicator, a number of claims, a dispute indicator, and/or a claim amount paid. The information displayed in step 1215 may also include other information, as further described below.

In step 1220, lender support information may be displayed. For example, a lender manual may be displayed to assist the user in using the system, to explain insurance and/or lending guidelines, or for any other reason. In step 1225, one or more processing reports may be generated and displayed. The processing report may include various types of information, as further described below.

In certain configurations, one or more of the systems of FIG. 2 (e.g., workstation 201, communication links 202 and 205, computer network 203, and/or server 204) may implement another method of providing information about one or more properties. FIG. 12b is a flowchart illustrating another method of providing information about one or more properties.

In step 1230, user input identifying one or more properties may be received. The user input may include, for example, a street address, city, state, ZIP code, a loan number, a work order number, a claim number, a borrower first name, and/or a borrower last name. In step 1235, it may be determined, based on property damage information, whether a property identified by the user input in step 1230 is damaged. Determining whether a property identified by the user input is damaged may include, for example, searching a database based on the user input, locating and retrieving records about the property (and/or other properties), and determining, based on those records, whether property damage information indicates that the property is damaged. The searching of the database and retrieving of records may be based on a database query. In one or more configurations, the property damage information may indicate the extent of the damage, the estimated cost of repair, and the like. For example, the property damage information may indicate that the property is "lightly damaged", "moderately damaged", or "severely damaged"; or, the property damage information may indicate that the property has an amount of damage expressed in terms of monetary value (e.g., "$12,000.00 of Damage").

In step 1240, it may be determined, based on insurance claim information, whether an insurance claim was filed with respect to the property and/or the damage thereto. Determining whether an insurance claim was filed may include, for example, searching a database based on the user input, locating and retrieving records about the property (and/or other properties), and determining, based on those records, whether insurance claim information indicates that an insurance claim has been filed. It is contemplated that in certain configurations, the property damage information may indicate that a property is damaged, while the insurance claim information may indicate that no insurance claim has been filed. For example, a property in foreclosure may have been damaged, but because the extent of the damage is lower than a deductible amount of a relevant insurance policy, no insurance claim was filed under that insurance policy.

In step 1245, the results of the previous steps may be returned. Specifically, in one or more configurations, a damage indicator, a claim status indicator, and other information identifying the property will be displayed. In certain configurations, the results may be returned via a web interface. For example, a web interface may be displayed, and the displayed web interface may include fields displaying the damage indicator, the claim status indicator, and other information identifying the property, as further described below. In step 1250, loan identification information, borrower information, work order information, loss information, and claim information optionally may be displayed. In certain configurations, this additional information may be displayed via one or more of the user interfaces further described below.

In certain configurations, before a user may access a database in which property information is stored or before a user may access a web portal by which property information is accessed and displayed, the user may first be authenticated (e.g., by entering a username and password). Further, the user may be assigned a level of permissions, which may operate to grant and/or limit access to the database and/or web portal. For example, the user may have sufficient permissions to access data in the database corresponding to a first set of foreclosed properties, but the user might not have sufficient permissions to access data in the database corresponding to a second set of foreclosed properties. In the same example, a different user may have sufficient permissions to access data in the database corresponding to the second set of foreclosed properties, but the different user might not have sufficient permissions to access data in the database corresponding to the first set of foreclosed properties.

In one or more configurations, one or more of the steps described above with respect to FIG. 12a and FIG. 12b may be performed with respect to multiple properties. In certain configurations, the multiple properties may be owned by different entities. For example, a first entity may own (in whole or in part) a first property, and a second entity may own (in whole or in part) a second property. Because of their ownership interest in one or more of the properties, each entity may be able to access a web interface by which each entity may be able to submit a request, causing one or more of the steps of the methods described above to be executed. In this manner, the methods described above and the user interfaces described below may be used to provide information about one or more properties.

Figure 13:
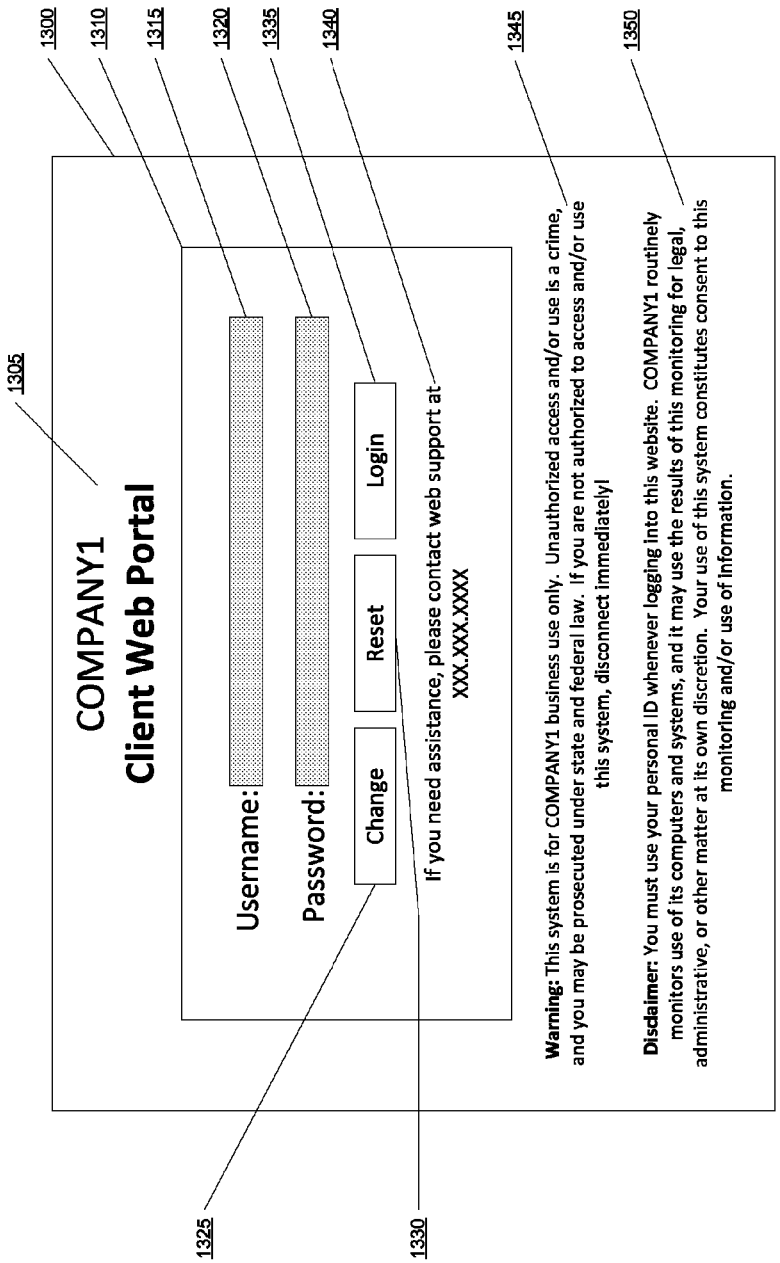
FIG. 13 illustrates a user interface allowing a user to login to a web portal according to one or more aspects described herein.

FIG. 13 illustrates a user interface 1300 allowing a user to login to a web portal according to one or more aspects described herein. In one or more arrangements, user interface 1300 may be displayed by a web browser program running on a workstation 201 at a remote location from a server 204. The user interface 1300 may include a logo and/or company information 1305. The user interface 1300 may further include a frame 1310 that contains one or more form fields and controls.

In one or more arrangements, the user interface 1300 may include field 1315, in which a user may enter a username, and field 1320, in which the user may enter a password corresponding to the username. In addition, the user interface 1300 may include a change button 1325, which may allow a user to change their password; reset button 1330, which may reset the fields 1315 and 1320, clearing any contents therein; and login button 1335, which may allow the user to submit for processing the username and password entered in fields 1315 and 1320, respectively. The user interface 1300 may further include support information 1340, a warning 1345, and a disclaimer 1350.

Figure 14:
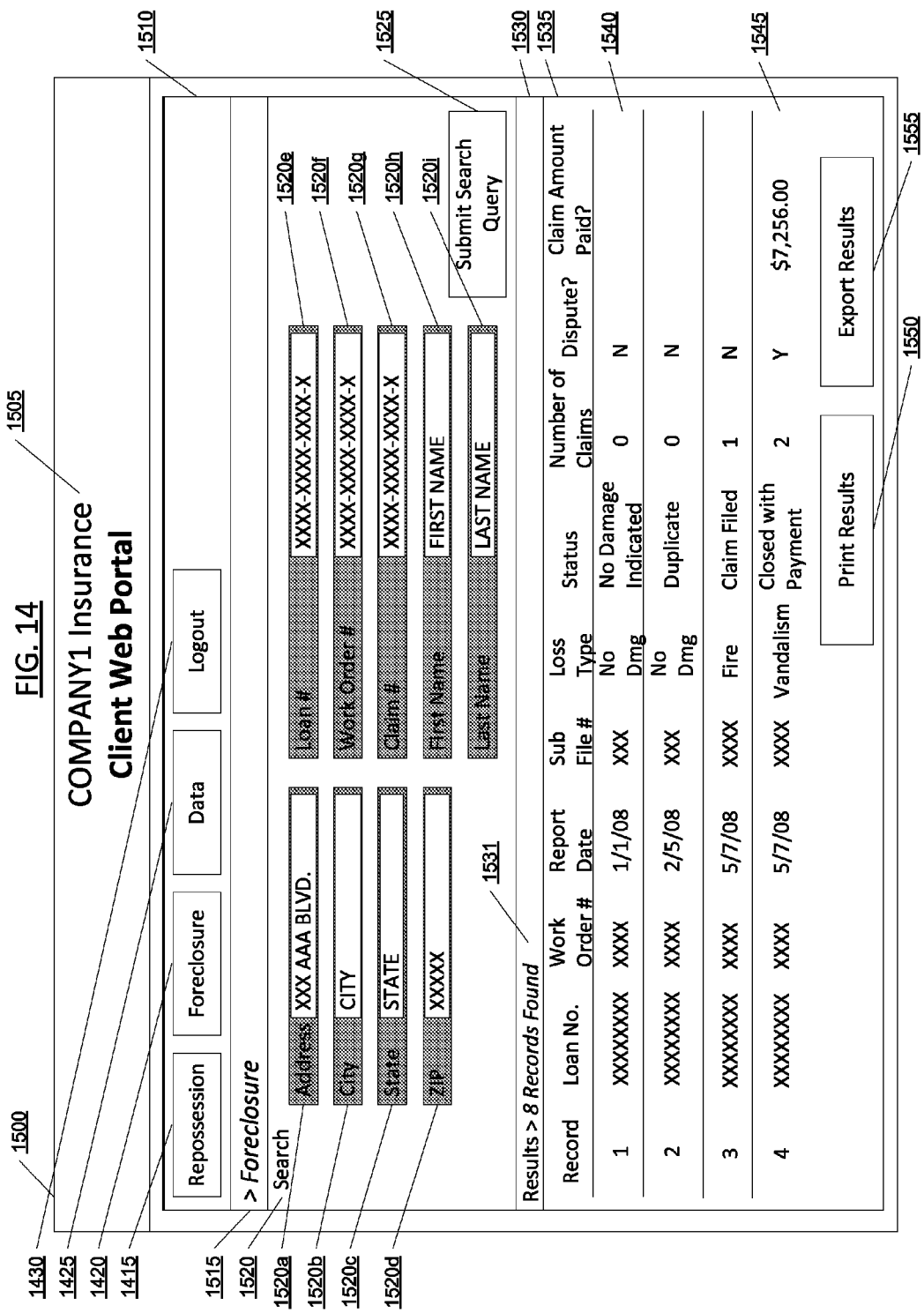
FIG. 14 illustrates a user interface allowing a user to access and view information about one or more properties according to one or more aspects described herein.

FIG. 14 illustrates a user interface 1500 allowing a user to access and view information about one or more properties according to one or more aspects described herein. In one or more arrangements, user interface 1500 may include a logo and/or company information 1405. User interface 1500 may further include frame 1510.

In this example, frame 1510 may include one or more navigation tabs, such as repossession tab 1415, foreclosure tab 1420, data tab 1425, and logout tab 1430. Frame 1510 may further include a selection indicator 1515 to indicate which tab is currently displayed. For example, selection indicator 1515 may be "Foreclosure" to indicate that the contents of the foreclosure tab 1420 are currently displayed.

In one or more configurations, foreclosure tab 1420 may include a search interface 1520. Search interface 1520 may include one or more fields in which a user may enter data, such as street address field 1520a, city field 1520b, state field 1520c, ZIP code field 1520d, loan number field 1520e, work order number field 1520f, claim number field 1520g, borrower first name field 1520h, and borrower last name field 1520*i*. Search interface 1520 may further include a submit search query button 1525, which may allow a user to initiate a search operation based on the data entered in the one or more fields in the search interface 1520. For example, a user may enter "1234-5678-9101-2" in loan number field 1520 and then activate search query button 1525 to initiate a search for records associated with that loan number.

The foreclosure tab 1420 may further include a search results area 1530. Search results area 1530 might be displayed only after a user activates search query button 1525. In addition, search results area 1530 might include a heading 1531 that indicates how many records were found in the search (e.g., "Results>8 Records Found").

Search results area 1530 may include a header row 1535 and one or more search results, such as records 1540 and 1545. Header row 1535 may include various headings, such as "Record," "Loan Number," "Address," "Borrower's Name," "Work Order Number," "Report Date," "Sub File Number," "Loss Type," "Status," "Number of Claims," "Dispute," and "Claim Amount Paid." Records 1540 and 1545 may contain information corresponding to the various headings in header row 1535. For example, record 1540 may have a status of "No Damage Indicated," while record 1545 may have a status of "Closed With Payment."

In one or more configurations, search results area 1530 may further include a print results button 1550 and an export results button 1555. Print results button 1550 may allow a user to create a printout of the search results. Export results button 1555 may allow a user to save a computer file containing the search results.

FIG. 15 illustrates a user interface 1600 allowing a user to access and view information about one or more properties according to one or more aspects described herein. In this example, user interface 1600 may display detailed information about a loss event associated with a particular property. For example, user interface 1600 may display detailed information about a vandalism incident that occurred at a property being foreclosed on by a lender. In this example, all of the detailed information being displayed in user interface 1600 would correspond to the same vandalism incident at the property being foreclosed on by the lender.

In one or more configurations, user interface 1600 may include property information 1605. Property information 1605 may include a loan number 1605*a*, a street address 1605*b*, a city 1605*c*, a state 1605*d*, a ZIP code 1605*e*, a borrower first name 1605*f*, and a borrower last name 1605*g*.

User interface 1600 may additionally include report information 1610. Report information 1610 may include a work order number 1610*a*, an inspection date 1610*b*, an upload date 1610*c*, a damage indicator 1610*d*, a review date 1610*e*, and status information 1610*f*.

User interface 1600 may additionally include coverage information 1615. Coverage information may include a coverage type indicator 1615*a*, a carrier name 1615*b*, a policy number 1615*c*, an effective start date 1615*d*, an effective end date 1615*e*, a deductible amount 1615*f*, coverage status information 1615*g*, and an insurance-verification complete date 1615*h*.

User interface 1600 may additionally include loss information 1625. Loss information 1625 may include loss type information 1625*a*, loss cause information 1625*b*, a date of loss 1625*c*, and technical review status information 1625*d*.

In one or more configurations, user interface 1600 may additionally include a control area 1620, which may include a home button 1620*a* and a print button 1620*b*. Home button 1620*a* may allow a user to return to the previous screen or to one of the navigation tabs (e.g., foreclosure tab 1420). Print button 1620*b* may allow a user to print the information currently being displayed.

In one or more arrangements, user interface 1600 may additionally include claim information 1630. Claim information 1630 may include a claim number 1630*a*, a claim filed date 1630*b*, a claim status 1630*c*, a claim close date 1630*d*, a denial reason 1630*e*, a dispute flag 1630*f*, a file owner name 1630*g*, a claim age 1630*h*, and a total payment amount 1630*i*.

User interface 1600 may further include a view claim button 1635 and a view record indicator 1640. View claim button 1635 may allow a user to load, access, and/or display claim information associated with a particular incident at a particular property. View record indicator 1640 may indicate to a user what claim information is being displayed.

In one or more configurations, when a user activates view claim button 1635, the activation may operate as a request for more information about an insurance claim. For example, after receiving a request for more information via activation of view claim button 1635, an insurance provider or claims administrator associated with the currently displayed insurance claim may be identified. Subsequently, in this example, more information about the currently displayed insurance claim may be retrieved from the insurance provider or claims administrator. For example, a new connection might be established to another database that may be located on a remote machine, and a query might be made of this other database to obtain more information about the currently displayed insurance claim. In this example, the other database may be located on a database associated with the insurance provider or claims administrator and stored on a remote machine operated by the insurance provider or claims administrator, and the user may be interacting with a system that is configured to connect to the insurance provider or claims administrator and/or the remote machine. Subsequently, in this example, once more information is retrieved from the insurance provider or claims administrator, it may be displayed on a web interface (e.g., on one or more of the user interfaces described herein).

FIG. 16 illustrates a user interface 1700 allowing a user to access and view information about one or more properties according to one or more aspects described herein. In one or more arrangements, user interface 1700 may display detailed information about a work order associated with a particular property. For example, user interface 1700 may display detailed information about a work order that resulted in repairs occurring at a property being foreclosed on by a lender. In this example, all of the detailed information being displayed in user interface 1700 would correspond to the same work order that resulted in repairs occurring at the property being foreclosed on by the lender.

In one or more arrangements, user interface 1700 may include work order details 1705. Work order details 1705 may include a loan number 1705*a*, a property address 1705*b*, a property city 1705*c*, a property state 1705*d*, a property ZIP code 1705*e*, a borrower first name 1705*f*, a borrower last name 1705*g*, a work order number 1705*h*, an order category 1705*i*, an inspection date 1705*j*, occupancy status information 1705*k*, a damage indicator 1705*l*, an upload date 1705*m*, a review date 1705*n*, and work order status information 1705*o*. In addition, work order details 1705 may include one or more pictures 1715, such as picture 1715*a*, picture 1715*b*, and picture 1715*c*.

In one or more configurations, user interface 1700 may additionally include a control area 1710, which may include a home button 1710*a* and a print button 1710*b*. Home button 1710*a* may allow a user to return to the previous screen or to one of the navigation tabs (e.g., foreclosure tab 1420). Print button 1710*b* may allow a user to print the information currently being displayed. In addition, user interface 1700 may include sub-file information 1720, which may list related sub-files, such as, for example, sub-file 1720*a*, sub-file 1720*b*, and sub-file 1720*c*.

FIG. 17 illustrates a user interface 1800 allowing a user to access and view information about one or more properties according to one or more aspects described herein. In one or more arrangements, user interface 1800 may display one or more user-selectable links that each allow a user to cause one or more reports to be generated and displayed. These reports may include information about one or more properties, and the reports may be customizable (e.g., the user may be able to choose what data is displayed with respect to each of the one or more properties).

In one or more arrangements, user interface 1800 may include a navigation bar 1805, which may include one or more navigation tabs, such as repossession tab 1805*a*, foreclosure tab 1805*b*, data tab 1805*c*, and logout tab 1805*d*. In addition, user interface 1800 may include reports frame 1810. In one or more configurations, reports frame 1810 may be displayed when a user selects data tab 1805*c*. For example, a user may activate data tab 1805*c*, and then reports frame 1810 may be displayed.

In one or more arrangements, reports frame 1810 may include a lender selection menu 1815 and a submit button 1820. A user may be able to choose from a listing of one or more lenders using lender selection menu 1815 and then activate submit button 1820 to cause one or more reports associated with the selected lender to be generated and displayed.

Reports frame 1810 may additionally include monthly reports frame 1825, daily reports frame 1830, weekly reports frame 1835, and lender support documentation frame 1840. Each of these frames may contain one or more user-selectable links that allow a user to cause one or more reports to be generated and displayed. For each report, a history link may also be displayed, which may allow a user to cause a report containing historical usage information of the particular report to be generated and displayed.

Monthly reports frame 1825 may include a business unit dashboard link 1825*a*, a cash management link 1825*b*, a claim production report link 1825*c*, a consolidated monthly report link 1825*d*, a disbursement activity link 1825*e*, a document cycle time link 1825*f*, a document processing link 1825*g*, an incoming call analysis link 1825*h*, an incomplete lines pertaining to newly boarded loans link 1825*i*, an LPP placement link 1825*j*, an outgoing letters link 1825*k*, a portfolio growth link 1825*l*, a premium obtainment link 1825*m*, a quality assurance of payment disbursements link 1825*n*, a scorecard link 1825*o*, and a summary notes link 1825*p*. Daily reports frame 1830 may include a catastrophe claims report link 1830*a* and a notices produced report link 1830*b*. Weekly reports frame 1835 may include a weekly pending claim status report link 1835*a*. Lender support documentation frame 1840 may include a lender manual link 1840*a*.

FIG. 18 illustrates a monthly processing report 1900 according to one or more aspects described herein. In one or more arrangements, monthly processing report 1900 may include a heading 1905, a creation date 1910, and a client identifier 1915. Monthly processing report 1900 may additionally include report data 1920 and report totals information 1970. In one or more configurations, report data 1920 may include a monthly (or weekly, daily, etc.) breakdown of various statistics, such as, for example, the number of claims with a particular claim status. In this example, the various statistics may be further broken down by insurance type and/or other variables.

While illustrative embodiments described herein embody various aspects are shown, it will be understood by those skilled in the art that the invention is not limited to these embodiments. Modifications may be made by those skilled in the art, particularly in light of the foregoing teachings. For example each of the elements of the aforementioned embodiments may be utilized alone or in combination or sub-combinations with the elements of the other embodiments. It will also be appreciated and understood that modification may be made without departing from the true spirit and scope of the present intention. The description is thus to be regarded as illustrative instead of restrictive on the present intention.

I claim:

1. A computer-implemented method of providing an information portal for enabling a lender to access information about one or more foreclosed properties associated with the lender, comprising:
  maintaining a property database at an information portal server, the property database containing property-specific information for one or more foreclosed properties, comprising the steps of:
    receiving property damage information for one or more foreclosed properties;
    receiving property insurance information relating to the one or more foreclosed properties;
    determining whether the one or more foreclosed properties is damaged based on damage information in the property database; and
    determining whether or not a property insurance claim was filed for the property based on property insurance information in the property database;
  receiving at the information portal server a first user input from a user associated with the lender;
  receiving at the information portal server a second user input from the user associated with the lender, the second user input comprising a set of one or more property characteristics;
  retrieving from the property database property data corresponding to a first set of foreclosed properties associated with the lender and having the one or more property characteristics, the first set of foreclosed properties comprising one or more foreclosed properties;
  displaying data corresponding to the properties in the first set of foreclosed properties, said data retrieved from the property database and comprising an identification of the properties in the first set of foreclosed properties, and a damage indicator and a property insurance claim status indicator for the properties in the first set of foreclosed properties.

2. The computer-implemented method of claim 1, further comprising:
  determining that the user providing the first user input has a sufficient level of permissions to access data in the property database corresponding to the first set of foreclosed properties.

3. The computer-implemented method of claim 1, further comprising:
  receiving at the information portal server a third user input from a second user, the second user being associated with a second lender;
  receiving at the information portal server a fourth user input from the second user, the fourth user input comprising a second set of one or more property characteristics;

retrieving from the property database property data corresponding to a second set of foreclosed properties associated with the second lender and having the second set of one or more property characteristics, the second set of foreclosed properties comprising one or more foreclosed properties;

displaying data corresponding to the properties in the second set of foreclosed properties, said data retrieved from the property database and comprising an identification of the properties in the second set of foreclosed properties, and a second damage indicator and a second property insurance claim status indicator for the properties in the second set of foreclosed properties.

4. The computer-implemented method of claim 1, wherein displaying the data comprises displaying a web interface.

5. The computer-implemented method of claim 4, wherein displaying the web interface further includes:
    displaying first loan identification information, first borrower information, first work order information, first loss information, and first claim information.

6. The computer-implemented method of claim 5, wherein the insurance claim information retrieved from the property database indicates that at least one insurance claim was filed for at least one foreclosed property, and wherein the method further comprises:
    receiving a request via the web interface for the insurance claim filed;
    identifying a provider associated with the insurance claim;
    retrieving the insurance claim from the provider; and
    displaying the insurance claim via the web interface.

7. An apparatus, comprising:
    a processor; and
    memory storing computer readable instructions that, when executed by the processor, cause the apparatus to perform:
        maintaining a property database, the property database containing property-specific information for one or more foreclosed properties, comprising the steps of:
            receiving property damage information for one or more foreclosed properties;
            receiving property insurance information relating to the one or more foreclosed properties;
            determining whether the one or more foreclosed properties is damaged based on damage information in the property database; and
            determining whether or not a property insurance claim was filed for the property based on property insurance information in the property database;
        receiving a first user input from a user associated with the lender;
        receiving a second user input from the user associated with the lender, the second user input comprising a set of one or more property characteristics;
        retrieving from the property database property data corresponding to a first set of foreclosed properties associated with the lender and having the one or more property characteristics, the first set of foreclosed properties comprising one or more foreclosed properties;
        displaying data corresponding to the properties in the first set of foreclosed properties, said data retrieved from the property database and comprising an identification of the properties in the first set of foreclosed properties, and a damage indicator and a property insurance claim status indicator for the properties in the first set of foreclosed properties.

8. The apparatus of claim 7, the memory further comprising instructions that, when executed by the processor, cause the apparatus to determine whether the user providing the first user input has a sufficient level of permissions to access data in the property database corresponding to the first set of foreclosed properties.

9. The apparatus of claim 7, the memory further comprising instructions that, when executed by the processor, cause the apparatus to:
    receive a third user input from a second user, the second user being associated with a second lender;
    receive a fourth user input from the second user, the fourth user input comprising a second set of one or more property characteristics;
    retrieve from the property database property data corresponding to a second set of foreclosed properties associated with the second lender and having the second set of one or more property characteristics, the second set of foreclosed properties comprising one or more foreclosed properties;
    display data corresponding to the properties in the second set of foreclosed properties, said data retrieved from the property database and comprising an identification of the properties in the second set of foreclosed properties, and a second damage indicator and a second property insurance claim status indicator for the properties in the second set of foreclosed properties.

10. The apparatus of claim 7, wherein displaying the data comprises displaying a web interface.

11. The apparatus of claim 10, wherein displaying the web interface further includes:
    displaying first loan identification information, first borrower information, first work order information, first loss information, and first claim information.

12. The apparatus of claim 11, wherein the insurance claim information retrieved from the property database indicates that at least one insurance claim was filed for at least one foreclosed property, and wherein the method further comprises:
    receiving a request via the web interface for the insurance claim filed;
    identifying a provider associated with the insurance claim;
    retrieving the insurance claim from the provider; and
    displaying the insurance claim via the web interface.

* * * * *